US012585245B2

(12) United States Patent
Uenishi et al.

(10) Patent No.: US 12,585,245 B2
(45) Date of Patent: *Mar. 24, 2026

(54) NUMERICAL VALUE CONTROLLER

(71) Applicant: FANUC CORPORATION, Yamanashi (JP)

(72) Inventors: Daisuke Uenishi, Yamanashi (JP); Tomohiro Oyamada, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 383 days.

This patent is subject to a terminal disclaimer.

(21) Appl. No.: 18/007,161

(22) PCT Filed: Aug. 25, 2021

(86) PCT No.: PCT/JP2021/031069
§ 371 (c)(1),
(2) Date: Jan. 27, 2023

(87) PCT Pub. No.: WO2022/045161
PCT Pub. Date: Mar. 3, 2022

(65) Prior Publication Data
US 2023/0236574 A1      Jul. 27, 2023

(30) Foreign Application Priority Data

Aug. 28, 2020      (JP) ................................. 2020-144506

(51) Int. Cl.
*G05B 19/4155*        (2006.01)
*B23Q 15/12*          (2006.01)
(52) U.S. Cl.
CPC ......... *G05B 19/4155* (2013.01); *B23Q 15/12* (2013.01); *G05B 2219/35519* (2013.01)
(58) Field of Classification Search
None
See application file for complete search history.

(56) References Cited

U.S. PATENT DOCUMENTS 5,267,620 A * 12/1993 Lee .......................... E21B 23/02
                                                   175/246
5,888,037 A * 3/1999 Fujimoto ............. G05B 19/416
                                                   408/1 R (Continued)

FOREIGN PATENT DOCUMENTS

CN           104133417 A      11/2014
CN           111459099 A       7/2020

(Continued)

OTHER PUBLICATIONS

Office Action issued on Mar. 26, 2025, in related U.S. Appl. No. 18/004,509, 32 pages.

*Primary Examiner* — Hua Lu
(74) *Attorney, Agent, or Firm* — Maier & Maier, PLLC

(57)                ABSTRACT

A numerical value controller includes: a storage unit storing a machining program involving executing canned cycles including a first operation for moving a tool to a return point, a second operation for positioning a drilling position of a workpiece relative to the tool, a third operation for moving the tool from the return point to a hole bottom point, and a fourth operation for moving the tool from the hole bottom point to a terminal point located toward the hole bottom point relative to the return point; a control unit controls relative movement between the tool and the workpiece based on the machining program and moves the tool along curved paths by starting the second operation before the first operation ends and by starting the third operation before the second operation ends; and a distance calculating unit calculates a retraction distance from the workpiece to the return point.

7 Claims, 7 Drawing Sheets

(56)　　　　　References Cited

U.S. PATENT DOCUMENTS

| | | | | |
|---|---|---|---|---|
| 6,671,573 B2 * | 12/2003 | Nigazawa | G05B 19/414 | 700/193 |
| 7,239,938 B2 * | 7/2007 | Otsuki | G05B 19/4061 | 700/189 |
| 8,000,833 B2 * | 8/2011 | Chiu | G05B 19/188 | 83/284 |
| 8,142,115 B2 * | 3/2012 | Reinhardt | B23B 51/108 | 408/224 |
| 9,280,150 B2 * | 3/2016 | Sato | G05B 19/4166 | |
| 9,639,079 B2 * | 5/2017 | Sakai | G05B 19/408 | |
| 10,532,438 B2 * | 1/2020 | Pereira | B23B 35/00 | |
| 10,976,716 B2 * | 4/2021 | Peters | G05B 19/19 | |
| 2002/0168238 A1 * | 11/2002 | Weber | B23B 47/34 | 408/1 R |
| 2003/0170085 A1 * | 9/2003 | Kakino | G05B 19/40937 | 409/132 |
| 2006/0184278 A1 * | 8/2006 | Nihei | B25J 9/1664 | 700/245 |
| 2007/0048098 A1 * | 3/2007 | Bone | B23B 41/12 | 408/1 R |
| 2007/0258777 A1 * | 11/2007 | Gunther | B23C 5/10 | 407/113 |
| 2009/0074523 A1 * | 3/2009 | Kawashita | B23B 41/02 | 408/11 |
| 2010/0158623 A1 * | 6/2010 | Danielsson | B23B 51/0486 | 408/83 |
| 2013/0307178 A1 * | 11/2013 | Kress | B23B 51/009 | 264/156 |
| 2014/0227043 A1 * | 8/2014 | Seegmiller | E21B 10/32 | 175/57 |
| 2014/0379115 A1 * | 12/2014 | Koyanaka | G05B 19/4166 | 700/159 |
| 2016/0103446 A1 * | 4/2016 | Aizawa | G05B 19/416 | 700/188 |
| 2016/0274566 A1 * | 9/2016 | Brambs | G05B 19/402 | |
| 2016/0303661 A1 * | 10/2016 | Rooney | B23B 47/281 | |
| 2017/0269576 A1 * | 9/2017 | Oonishi | G05B 19/416 | |
| 2018/0079043 A1 * | 3/2018 | Inoue | G05B 19/29 | |
| 2023/0251627 A1 | 8/2023 | Uenishi et al. | | |

FOREIGN PATENT DOCUMENTS

| | | | |
|---|---|---|---|
| JP | S63005410 A | 1/1988 |
| JP | S64027838 A | 1/1989 |
| JP | H01108604 A | 4/1989 |
| JP | H08118048 A | 5/1996 |
| JP | H09120310 A | 5/1997 |
| JP | H11305819 A | 11/1999 |
| JP | 2000167716 A | 6/2000 |
| JP | 2006099347 A | 4/2006 |
| JP | 2008046899 A | 2/2008 |
| JP | 2009053926 A | 3/2009 |
| JP | 2016038617 A | 3/2016 |
| JP | 2017004300 A | 1/2017 |
| JP | 2018140470 A | 9/2018 |
| JP | 2020067921 A | 4/2020 |
| JP | 2021012522 A | 2/2021 |
| JP | 2021064363 A | 4/2021 |
| JP | 2021076955 A | 5/2021 |
| WO | 2016157456 A1 | 10/2016 |
| WO | 2018042704 A1 | 3/2018 |

* cited by examiner

```
G81 G99 X0 Y0 Z-10. R5. W1. F1000
X10.
X11.
G80
```

11b

11a

```
                      ⋮
G81 G99 X0 Y0 Z-10. R5. F1000
X10.                                  } 11b        11a
X11.
G80
                      ⋮
```

1

NUMERICAL VALUE CONTROLLER

TECHNICAL FIELD

The present invention relates to numerical value controllers.

BACKGROUND

A known control method for a machine tool in the related art achieves a high-speed drilling process by optimizing a path along which a tool moves relative to a workpiece (for example, see Japanese Unexamined Patent Application, Publication No. Hei 9-120310). If the path has discontinuous points, such as corners, the tool pauses relative to the workpiece at each discontinuous point. In the case of the drilling process in Japanese Unexamined Patent Application, Publication No. Hei 9-120310, vertical movement of the tool and horizontal movement of the workpiece are temporally overlapped with each other, so that the movement path of the tool at each corner is made into a circular-arc-like curved path, thereby enabling continuous movement of the tool.

SUMMARY

An aspect of the present disclosure provides a numerical value controller for a machine tool that relatively moves a tool and a workpiece in a first direction and a second direction so as to drill a hole in the workpiece by using the tool. The first direction extends along a longitudinal axis of the tool. The second direction intersects the longitudinal axis of the tool. The numerical value controller includes a storage unit, a control unit, a distance calculating unit, and a curvature calculating unit. The storage unit stores a machining program that involves executing a plurality of canned cycles. Each of the plurality of canned cycles includes a first operation, a second operation, a third operation, and a fourth operation. The first operation involves relatively moving the tool and the workpiece in the first direction so as to move the tool to a return point where the tool is retracted from the workpiece in the first direction. The second operation involves relatively moving the tool and the workpiece in the second direction so as to position a drilling position of the workpiece relative to the tool. The third operation involves relatively moving the tool and the workpiece in the first direction so as to move the tool from the return point to a hole bottom point. The fourth operation involves relatively moving the tool and the workpiece in the first direction so as to move the tool from the hole bottom point to a terminal point located toward the hole bottom point relative to the return point. The control unit controls the relative movement between the tool and the workpiece based on the machining program. The control unit moves the tool along a first curved path by starting the second operation before the first operation ends, and moves the tool along a second curved path by starting the third operation before the second operation ends. The distance calculating unit calculates a retraction distance from the workpiece to the return point in the first direction. The curvature calculating unit calculates an amount of curvature of each of the first curved path and the second curved path. The curvature calculating unit calculates the amount of curvature of each of the first curved path and the second curved path for each of the plurality of canned cycles based on the retraction distance and the drilling position in each of the plurality of canned cycles. The control unit moves the tool along the first curved path and the second curved path each having the amount of curvature calculated by the curvature calculating unit in each of the plurality of canned cycles.

DETAILED DESCRIPTION OF THE EMBODIMENTS

A numerical value controller according to an embodiment will be described below with reference to the drawings.

Figure 1:
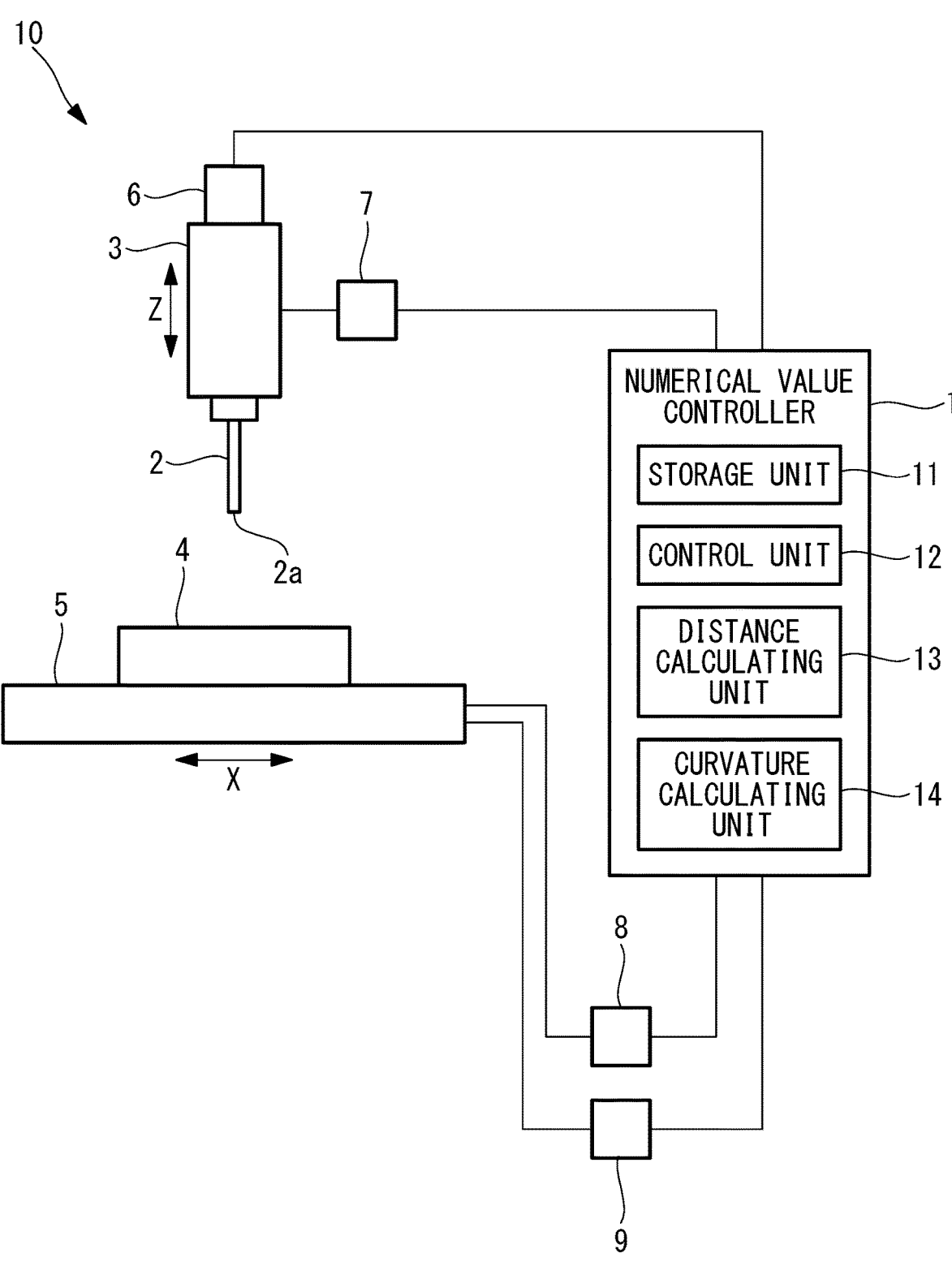
FIG. 1 illustrates the configuration of a machine tool according to an embodiment.

As shown in FIG. 1, a numerical value controller 1 is for a machine tool 10 that machines a workpiece 4 by using a tool 2.

The machine tool 10 includes a spindle 3 that holds the tool 2, a table 5 that holds the workpiece 4, a spindle motor 6 that rotates the spindle 3 around the longitudinal axis of the spindle 3, a Z-axis feed motor 7 that moves the spindle 3 in a Z direction (second direction) relative to the table 5, an X-axis feed motor 8 and a Y-axis feed motor 9 that move the table 5 in an X direction (first direction) and a Y direction (first direction), respectively, relative to the spindle 3, and the numerical value controller 1 that controls the motors 6, 7, 8, and 9.

The Z direction extends along the longitudinal axis of the tool 2 held by the spindle 3. The X direction and the Y direction are orthogonal to the longitudinal axis of the tool 2 held by the spindle 3 and are orthogonal to each other. In the machine tool 10 in FIG. 1, the Z direction extends vertically, whereas the X direction and the Y direction extend horizontally.

The spindle 3 is disposed in the vertical direction and is supported by a support mechanism (not shown) in such a manner as to be vertically movable. The tool 2 is held coaxially with the spindle 3 by a lower end of the spindle 3 and rotates and moves together with the spindle 3. The tool 2 is a drill that forms a hole 4a in the workpiece 4 in the depth direction (Z direction) thereof. The tool 2 may alternatively be another type of tool for machining the workpiece 4 in the depth direction, and may be, for example, a milling cutter or an end mill.

The table 5 is disposed horizontally below the spindle 3. The workpiece 4 placed on the upper surface of the table 5 is fixed to the table 5 by using a jig (not shown).

The spindle motor 6 is connected to the upper end of the spindle 3 and rotates the spindle 3 around the longitudinal axis of the spindle 3.

The feed motors 7, 8, and 9 are servomotors.

The numerical value controller 1 includes a storage unit 11, a control unit 12, a distance calculating unit 13, and a curvature calculating unit 14.

The storage unit 11 has, for example, a RAM, a ROM, and another storage device, and stores a machining program 11*a* (see FIG. 2) for drilling a hole in the workpiece 4 in accordance with relative movement between the tool 2 and the workpiece 4.

The numerical value controller 1 has a processor, such as a central processing unit. The control unit 12, the distance calculating unit 13, and the curvature calculating unit 14 are implemented by the processor.

Figure 2:
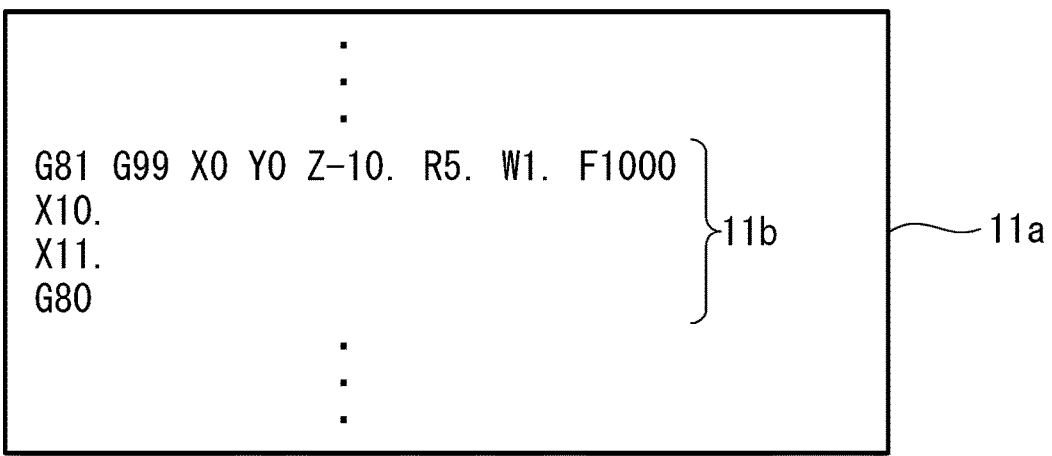
FIG. 2 illustrates an example of a drilling canned cycle program.
Figure 3:
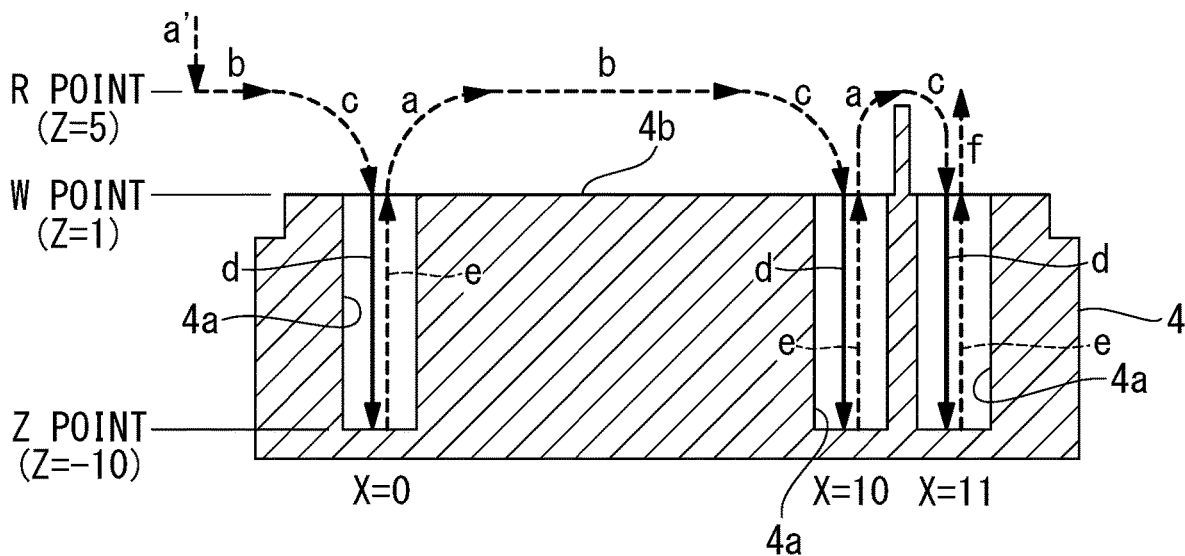
FIG. 3 illustrates an example of a drilling process according to a drilling canned cycle.

As shown in FIG. 2, the machining program 11*a* includes a drilling canned cycle program 11*b*. As shown in FIG. 3, the canned cycle program 11*b* causes the machine tool 10 to execute a canned cycle including four operations multiple times. In FIG. 3, dashed and solid arrows each indicate a path along which the tool 2 moves relative to the workpiece 4. In FIG. 3, the horizontal direction is the X direction, the direction orthogonal to the plane of the drawing is the Y direction, and the vertical direction is the Z direction.

In FIG. 3, a path along which the tool 2 moves at a rapid traverse rate relative to the workpiece 4 is indicated with a dashed line, and a path along which the tool 2 moves at a cutting feed rate relative to the workpiece 4 is indicated with a solid line. The rapid traverse rate is the maximum rate of each of the feed motors 7, 8, and 9. The cutting feed rate is a rate suitable for the tool 2 to drill a hole in the workpiece 4 and is a command rate set in the machining program.

The machining program 11*a* includes commands for designating a W point (workpiece height point), an R point (return point), and a Z point (hole bottom point). The W point is the position of a workpiece surface 4*b* in the Z direction. The workpiece surface 4*b* is the surface of the workpiece 4 from where the tool 2 starts to perform a drilling (cutting) process on the workpiece 4, and is the upper surface of the workpiece 4 in this embodiment. The R point is the position, in the Z direction, retracted in the Z direction from the workpiece surface 4*b*, and is located away from the workpiece surface 4*b* by, for example, 1 mm to 5 mm. The Z point is the position of the bottom of the hole 4*a* in the Z direction and is located opposite from the R point relative to the workpiece surface 4*b*.

The first operation involves moving a tip 2*a* of the tool 2 in the Z direction to the R point by moving the spindle 3 in the Z direction. Paths a' and a are the paths of the tool 2 in the first operation.

The second operation involves moving the workpiece 4 in the XY direction relative to the tool 2 by moving the table 5 in the XY direction, so as to position a drilling position of the workpiece 4 in the XY direction relative to the tool 2. Paths a, b, and c are the paths of the tool 2 in the second operation.

The third operation involves moving the tip 2*a* of the tool 2 in the Z direction from the R point to the Z point by lowering the spindle 3 in the Z direction, so as to drill a hole in the drilling position of the workpiece 4. Paths c and d are the paths of the tool 2 in the third operation.

The fourth operation involves moving the tip 2*a* of the tool 2 in the Z direction from the Z point to the W point (terminal point) by raising the spindle 3 in the Z direction, so as to remove the tool 2 from the hole 4*a*. A path e is the path of the tool 2 in the fourth operation.

FIG. 3 illustrates an example of the canned cycle program 11*b* that involves repeating the canned cycle three times.

"G81" is a command code for executing the drilling canned cycle, "G99" is a command code for returning to the R point, and "G80" is a command code for canceling the canned cycle. "X0 Y0" is a positioning command for positioning the drilling position in the X direction and the Y direction, "Z-10" is a command for the Z point, "R5." is a command for the R point, "W1." is a command for the W point, and "F1000" is a command for the cutting feed rate. Specifically, the R point is set to Z=5 mm, the Z point is set to Z=−10 mm, and the W point is set to Z=1 mm. In the second and third rows, the commands Y, Z, R, W, and F whose command values are identical to those in the first row are omitted.

The control unit 12 controls the movement of the spindle 3 in the Z direction by controlling the feed motor 7, thereby controlling the movement of the tool 2 in the Z direction. Furthermore, the control unit 12 controls the movement of the table 5 in the XY direction by controlling the feed motors 8 and 9, thereby controlling the movement of the workpiece 4 in the XY direction.

The control unit 12 controls the feed motors 7, 8, and 9 based on the machining program 11*a*, so as to cause the machine tool 10 to execute the first operation, the second operation, the third operation, and the fourth operation.

The control unit 12 starts the third operation before the second operation ends, so as to cause the movement of the workpiece 4 in the XY direction in the second operation and the movement of the tool 2 in the Z direction in the third operation to temporally overlap each other. Consequently, the tip 2*a* of the tool 2 moves along a second curved path c from the R point to the W point.

From the second canned cycle onward, the control unit 12 starts the second operation before the first operation ends, so as to cause the movement of the tool 2 in the Z direction in the first operation and the movement of the workpiece 4 in the XY direction in the second operation to temporally overlap each other. Consequently, the tip 2*a* of the tool 2 moves along a first curved path a from the W point to the R point.

The distance calculating unit 13 calculates the distance between the W point and the R point in the Z direction as a retraction distance from the workpiece 4 to the R point in the Z direction. In detail, the distance calculating unit 13 reads the machining program 11*a* from the storage unit 11, acquires the command values for the R point and the W point from the canned cycle program 11*b*, and calculates a difference |R−W| between the command values. The retraction distance |R−W| is a maximum radius of curvature r of each of the curved paths a and c.

The curvature calculating unit 14 reads a positioning command for a subsequent canned cycle from the canned cycle program 11*b* before the fourth operation ends, and calculates a radius of curvature rn (n=2, 3) of each of the curved paths a and c for the subsequent canned cycle based on the read positioning command.

In detail, the curvature calculating unit 14 calculates a movement distance Ln from command values $X_{n-1}$ and $Y_{n-1}$ of the positioning command for the current canned cycle and command values $X_n$ and $Y_n$ of the positioning command for the subsequent canned cycle. The movement distance Ln is the distance by which the tool 2 moves in the XY direction from the drilling position in the current canned cycle to the drilling position in the subsequent canned cycle, and is calculated from the following expression.

5

$$\mathrm{Ln}=\{(X_{n-1}-X_n)^2+(Y_{n-1}-Y_n)^2\}^{1/2}$$

Subsequently, the curvature calculating unit 14 calculates the radius of curvature rn based on the movement distance Ln and the retraction distance |R−W|.

Specifically, if half of Ln is greater than or equal to |R−W|, the curvature calculating unit 14 calculates the maximum radius of curvature r as the radius of curvature rn. If half of Ln is smaller than |R−W|, the curvature calculating unit 14 calculates half of Ln as the radius of curvature rn.

The control unit 12 controls the descending timing of the tool 2 in the third operation based on the radius of curvature rn, so as to move the tip 2a of the tool 2 along the curved path c having the radius of curvature rn.

Moreover, the control unit 12 controls the start timing for moving the workpiece 4 in the second operation to the next drilling position based on the radius of curvature rn, so as to move the tip 2a of the tool 2 along the curved path a having the radius of curvature rn.

Figure 4:
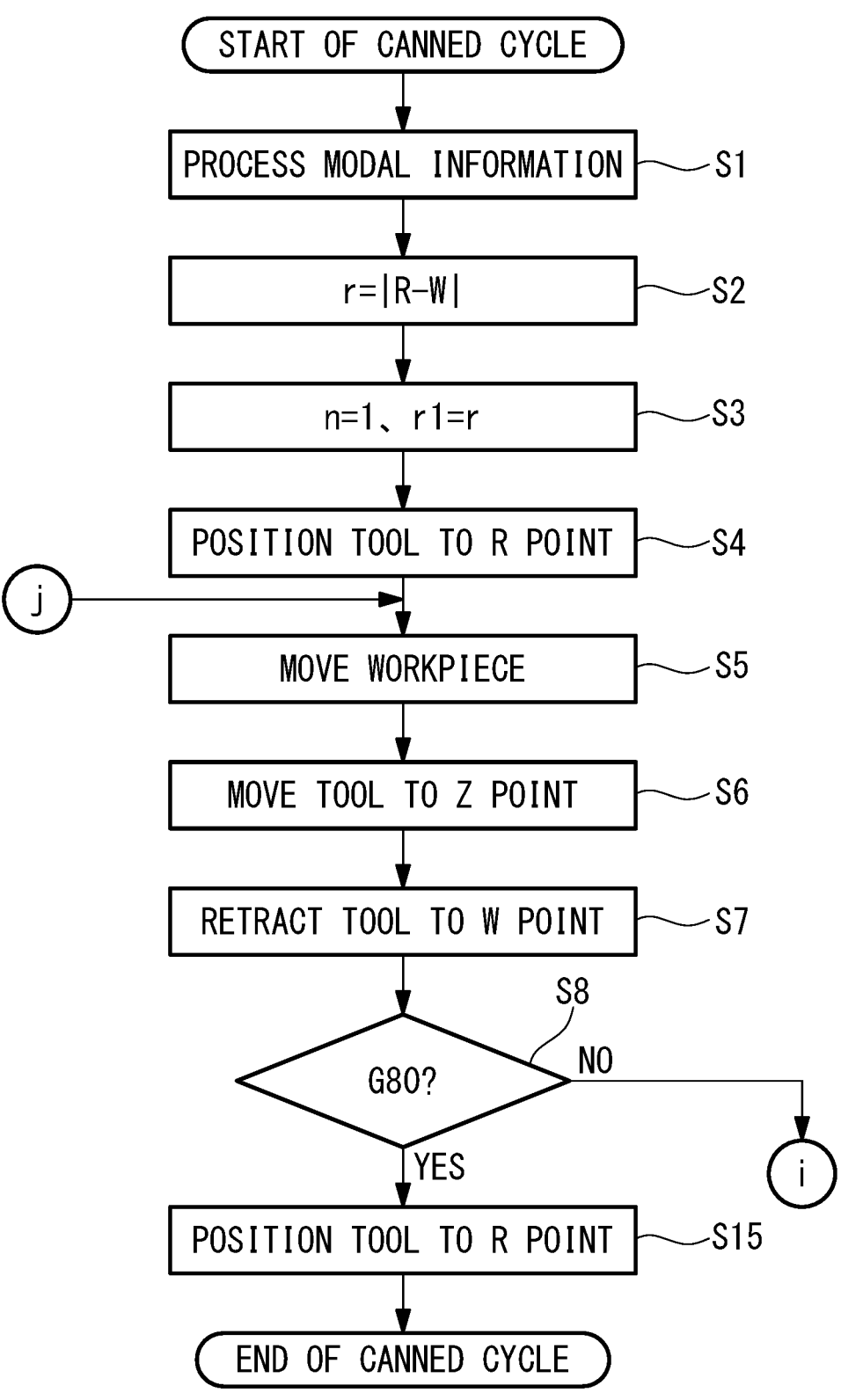
FIG. 4 is a flowchart illustrating a machine-tool control method.
Figure 5:
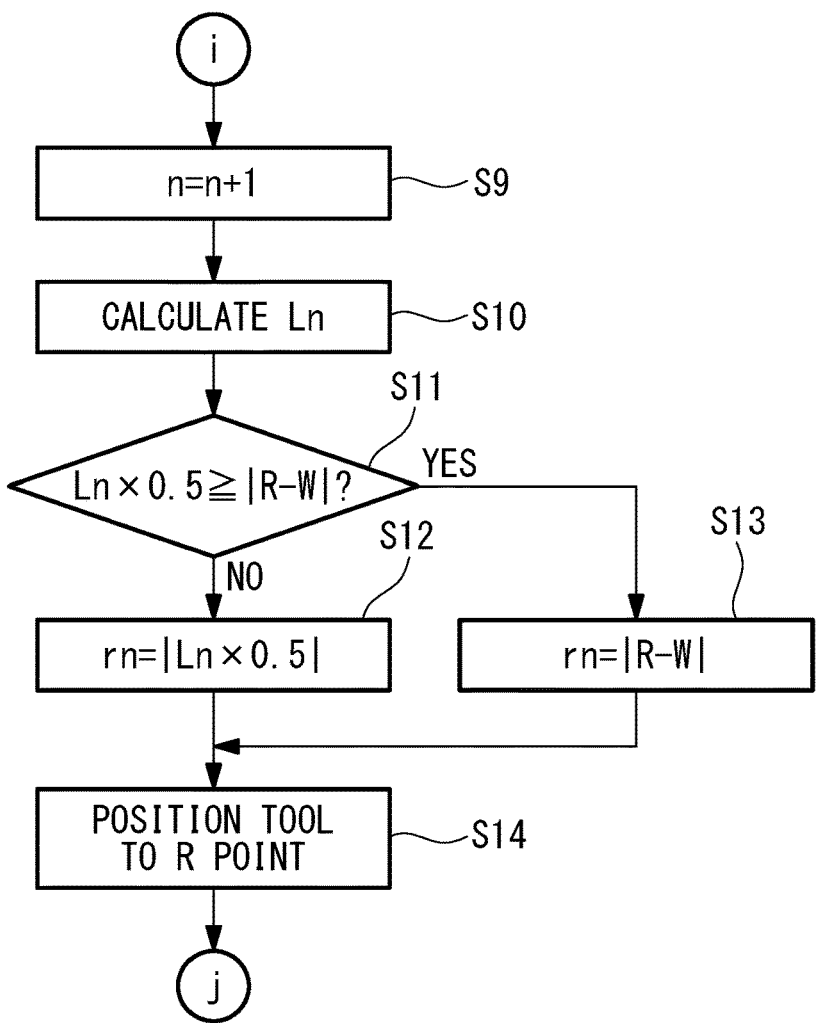
FIG. 5 is a flowchart continuing from the flowchart in FIG. 4.

Next, a method of how the numerical value controller 1 controls the machine tool 10 will be described with reference to FIGS. 4 and 5.

When the canned cycle program 11b commences, the numerical value controller 1 first processes modal information, such as the R point, the Z point, the command rate, and the operation mode (step S1).

Then, the distance calculating unit 13 acquires the command values for the R point and the W point from the drilling machining program 11a and calculates the retraction distance |R−W| serving as the maximum radius of curvature r of each of the curved paths a and c (step S2).

Subsequently, the control unit 12 causes the machine tool 10 to execute a first canned cycle (step S4 to step S7). Specifically, the control unit 12 causes the spindle 3 to execute the first operation by controlling the feed motor 7, and moves the tip 2a of the tool 2 to the R point along a linear path a' (step S4). Then, the control unit 12 causes the table 5 to start executing the second operation by controlling the feed motors 8 and 9 (step S5), and positions a first drilling position of the workpiece 4 relative to the tool 2.

Subsequently, the control unit 12 causes the spindle 3 to start executing the third operation by controlling the feed motor 7 (step S6), and causes the tool 2 to drill a hole in the first drilling position. In this case, the control unit 12 starts the third operation before the second operation ends, thereby moving the tip 2a of the tool 2 along the curved path c. The radius of curvature of the curved path c in the first canned cycle is the calculated maximum radius of curvature r.

Upon completion of the third operation, the control unit 12 causes the spindle 3 to start executing the fourth operation by controlling the feed motor 7 (step S7), and causes the tip 2a of the tool 2 to retract from the Z point to the W point. When the tip 2a of the tool 2 is retracted to the W point, the first canned cycle ends.

If there is a subsequent drilling position and a command for canceling the canned cycle based on G80 is not given (NO in step S8), the curvature calculating unit 14 calculates a radius of curvature r2 for a subsequent canned cycle (step S9 to step S13) after the start of the fourth operation. In detail, the curvature calculating unit 14 reads a positioning command for the subsequent canned cycle from the canned cycle program 11b to calculate a movement distance L2 of the tool 2 to the subsequent drilling position (step S10), and calculates the radius of curvature r2 based on the movement distance L2 and the retraction distance |R−W| (step S11 to step S13).

Then, the control unit 12 causes the machine tool 10 to execute a second canned cycle (step S14 and steps S5 to S7). Specifically, the control unit 12 causes the spindle 3 to execute the first operation by controlling the feed motor 7 (step S14), and moves the tip 2a of the tool 2 from the W point to the R point.

The control unit 12 starts the second operation before the first operation ends (step S5). The start timing for the second operation is controlled based on the radius of curvature r2. Specifically, if the radius of curvature r2 is greater than or equal to the retraction distance |R−W|, the second operation is started simultaneously with the start of the first operation, and the tip 2a of the tool 2 moves along the curved path a from the W point to the R point. If the radius of curvature r2 is smaller than the retraction distance |R−W|, the second operation starts when the distance from the tip 2a to the R point in the Z direction becomes equal to the radius of curvature r2 after the start of the first operation. Specifically, the tip 2a of the tool 2 moves from the W point along a linear path, and subsequently moves to the R point along the curved path a.

Subsequently, the control unit 12 starts the third operation before the second operation ends (step S6). The start timing for the third operation is controlled based on the radius of curvature r2. Specifically, if the radius of curvature r2 is greater than or equal to the retraction distance |R−W|, the third operation starts when the distance from the tool 2 to the drilling position in the XY direction becomes equal to the radius of curvature r2, and the tip 2a of the tool 2 moves along the curved path c from the R point to the W point. If the radius of curvature r2 is smaller than the retraction distance |R−W|, the third operation starts simultaneously with the end of the first operation. The tip 2a of the tool 2 moves along the curved path c from the R point to a position higher than the W point, and then moves along a linear path to the Z point via the W point.

The control unit 12 executes the fourth operation in the second canned cycle similarly to that in the first canned cycle, and further executes a third canned cycle. After the fourth operation in the third canned cycle (YES in step S8), the control unit 12 causes the tip of the tool 2 to move along a linear path f from the W point to the R point in the Z direction (step S15), and ends the third canned cycle.

Figure 9:
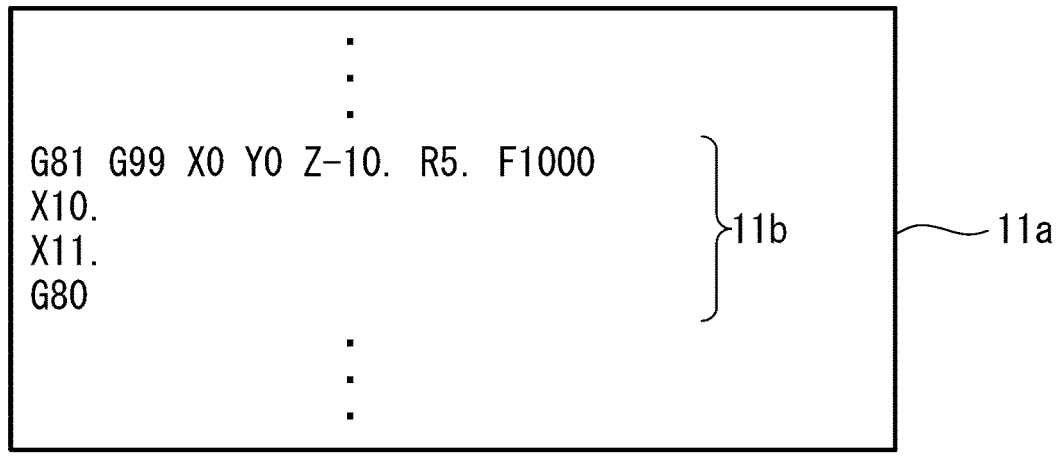
FIG. 9 illustrates an example of a drilling canned cycle program in the related art.
Figure 10:
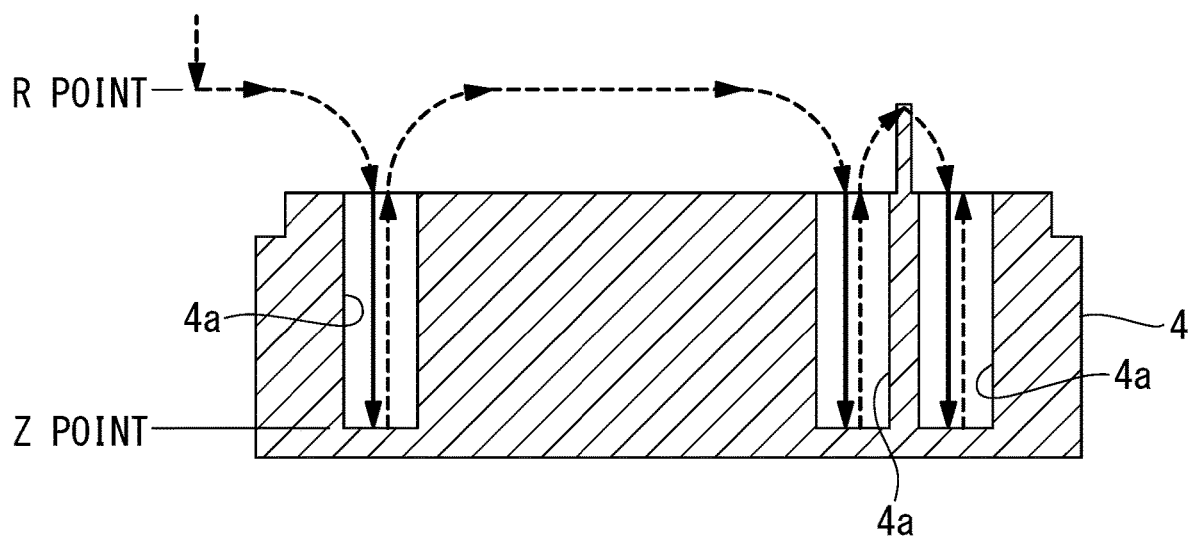
FIG. 10 illustrates an example of a drilling process according to a drilling canned cycle in the related art.

FIGS. 9 and 10 illustrate a drilling canned cycle in the related art. As shown in FIG. 9, the canned cycle program 11b in the related art does not include a command related to the W point, and the radius of curvature rn of a curved path is determined in accordance with a set overlap amount. Specifically, as shown in FIG. 10, the tip 2a of the tool 2 moves along a curved path having a fixed radius of curvature determined in accordance with the set overlap amount. Therefore, if the movement distance Ln to a subsequent drilling position is small in a state where an overlap amount optimal for the height of a certain R point is set, the tip 2a of the tool 2 starts to descend before it has ascended to the R point. The height at the upper surface of the workpiece 4 is not necessarily uniform. The upper surface of the workpiece 4 may include an area higher than other areas, as in the case of a protrusion between a second drilling position and a third drilling position. Thus, the tool 2 may interfere with the workpiece 4 before the tool 2 has ascended to the R point.

In this embodiment, the command for the W point is added to the canned cycle program 11b, such that each canned cycle involves the tip 2a of the tool 2 moving to the R point, the Z point, and the W point in this sequence. When the tip 2a of the tool 2 has moved to the W point, a single canned cycle is completed. Then, before the canned cycle ends, a positioning command for a subsequent canned cycle is preliminarily read. Based on the movement distance Ln to a subsequent drilling position and the retraction distance |R−W|, the radius of curvature rn appropriate for each of the curved paths a and c in the subsequent canned cycle is automatically calculated.

Accordingly, the radius of curvature rn is calculated for each drilling position, so that the tip 2a of the tool 2 can be reliably retracted to the R point even when the movement distance Ln is small, thereby preventing the tool 2 from interfering with the workpiece 4 while moving to a subsequent drilling position.

Furthermore, since information to be preliminarily read is a positioning command for a subsequent canned cycle alone, the numerical value controller 1 does not require high reading performance. Specifically, regardless of the reading performance of the numerical value controller 1, a radius of curvature rn appropriate for each drilling position can be calculated.

In this embodiment, an operator may be allowed to modify the canned cycle program 11b.

Figure 6:
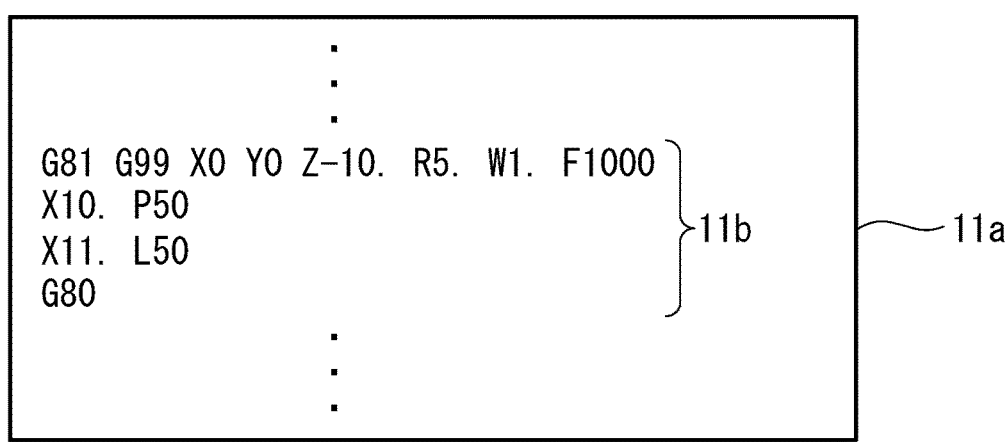
FIG. 6 illustrates a modification of the drilling canned cycle program.

In one example, a radius-of-curvature correction command may be added to the canned cycle program 11b. As shown in FIG. 6, an example of the correction command is a command for designating a multiplying factor P of the radius of curvature. The multiplying factor P is set between 0% and 100%. The multiplying factor P may be settable for each drilling position. As indicated in step S12' and step S13' in FIG. 8, the curvature calculating unit 14 corrects the radius of curvature by multiplying it by the multiplying factor P, and the control unit 12 controls the movement path of the tool 2 based on the corrected radius of curvature rn. With the addition of such a correction command, the movement path of the tool 2 can be managed more finely.

As an alternative to this embodiment in which the terminal point serving as the position of the tip 2a of the tool 2 at the time of completion of each canned cycle is the W point, the terminal point may be any position located toward the Z point relative to the return point. Specifically, the terminal point may be the Z point or may be an intermediate position between the Z point and the return point. If the terminal point is the Z point, the canned cycle ends when the tip 2a of the descending tool 2 reaches the Z point.

Figure 7:
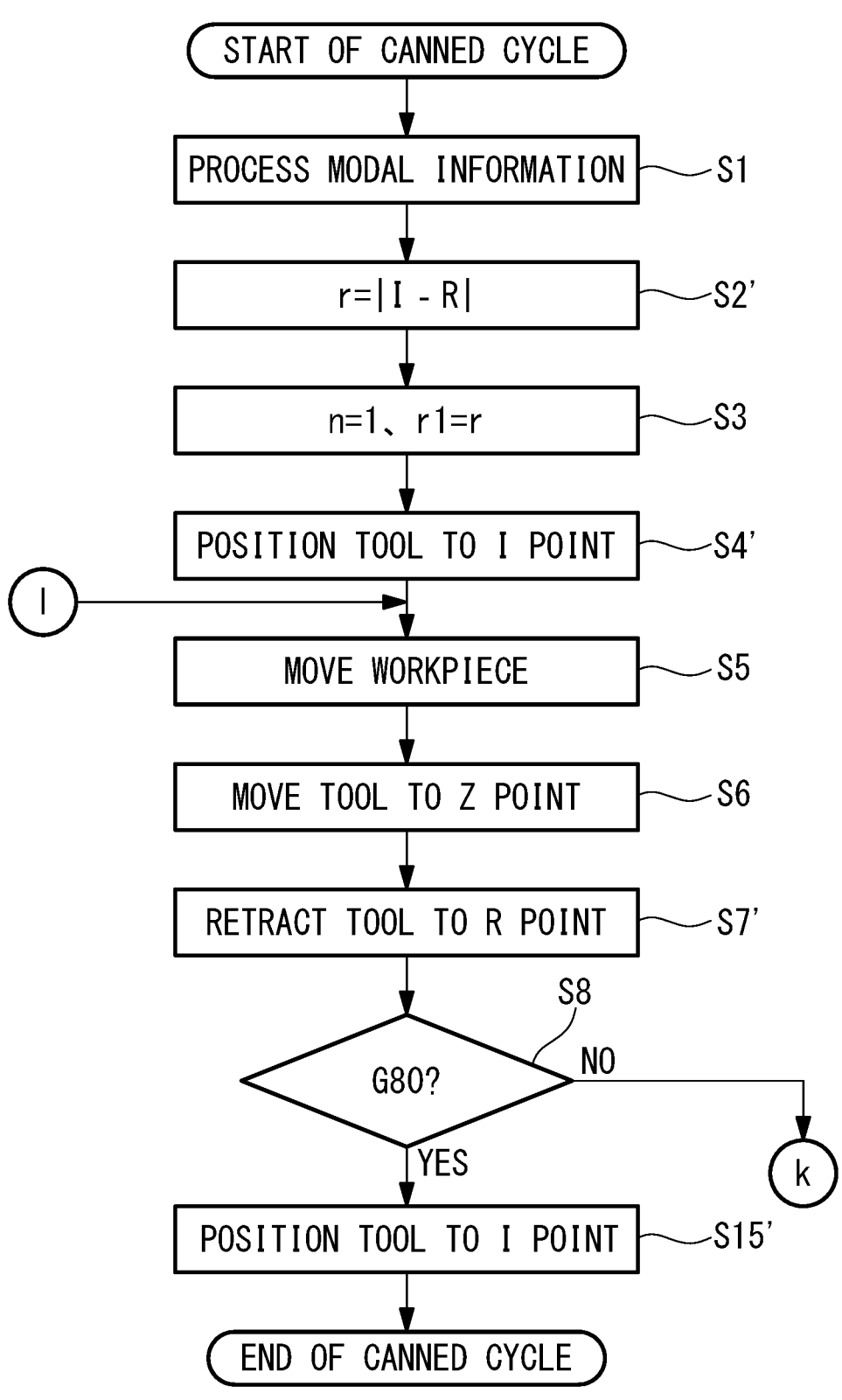
FIG. 7 is a flowchart illustrating a modification of the machine-tool control method.
Figure 8:
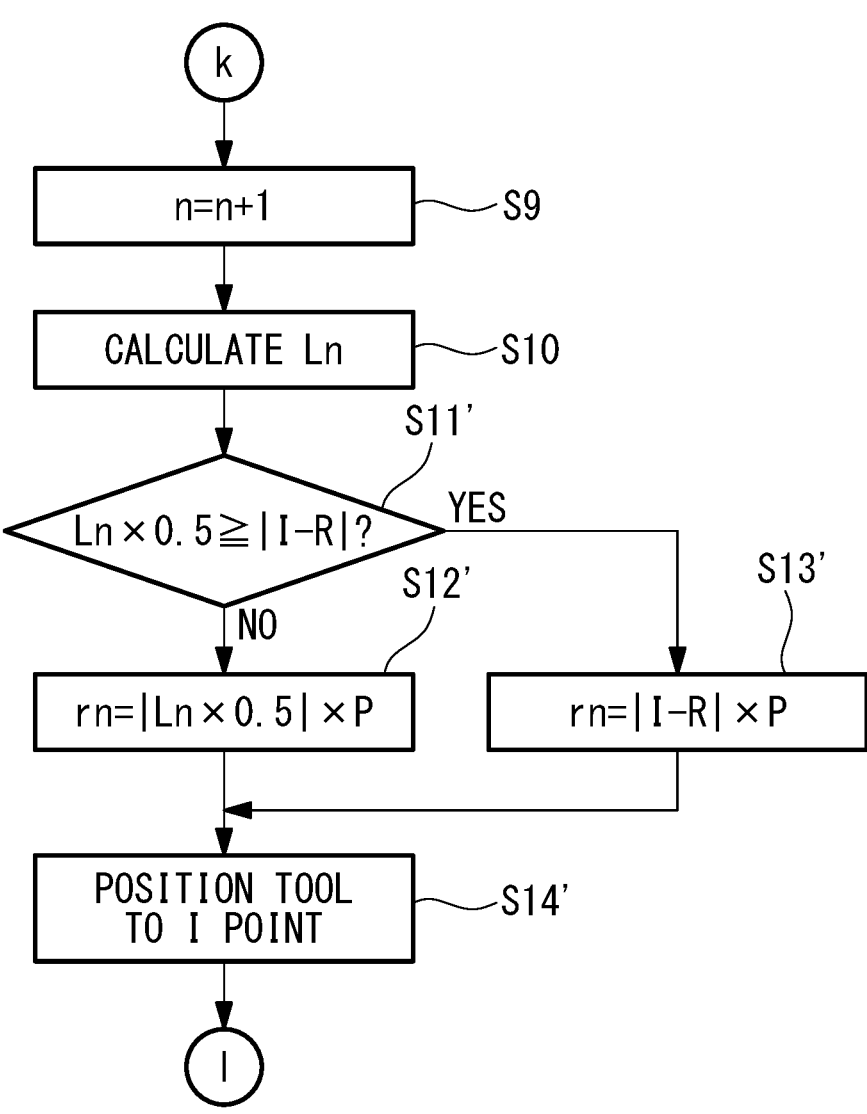
FIG. 8 is a flowchart continuing from the flowchart in FIG. 7.

As an alternative to this embodiment in which the return point is the R point (reference point), the return point may be an initial point (I point). Specifically, as shown in FIGS. 6 to 8, an initial-point return mode based on G98 that involves returning the tip 2a of the tool 2 to the initial point may be used instead of the R-point return mode based on G99. The initial point is the position of the tip 2a in the Z direction at the time when the canned cycle program lib starts, and is retracted from the workpiece 4 in the Z direction relative to the R point. For example, in a case where the R point is Z=5 mm, the initial point is Z=100 mm. The tool 2 located at the initial point is separated from the workpiece 4 and the jig by a sufficient distance. In the case of the initial-position return mode, the tip 2a of the tool 2 moves to the initial point in steps S4' and S14' of the first operation, as shown in FIGS. 7 and 8.

If the initial-point return mode is to be used, the terminal point may be the R point instead of the W point. Specifically, as indicated in step S7' and step S14' in FIG. 7, the canned cycle may end when the tip 2a of the tool 2 has retracted to the R point. By setting the R point as the terminal point in this manner, interference between the tool 2 and the workpiece 4 can be prevented more reliably.

Furthermore, if the initial-point return mode is to be used, the retraction distance may be the distance between the R point and the initial point in the Z direction, as shown in FIG. 8. Specifically, a retraction distance |I−R| may be calculated as the maximum radius of curvature r in step S2', and |I−R| may be used as a criterion in step S11'. In this case, I denotes a command value for the initial point.

In this embodiment, the curvature calculating unit 14 calculates the radius of curvature rn for the second canned cycle and onward based on the retraction distance and the positioning command. In addition, the curvature calculating unit 14 may calculate a radius of curvature r1 for the first canned cycle based on at least one of the retraction distance and the positioning command.

For example, the calculation of the radius of curvature r1 is executed between the positioning to the R point (step S4) and the positioning to the drilling position (step S5). For example, as the radius of curvature r1, the curvature calculating unit 14 may calculate the retraction distance |R−W| between the R point and the W point in the Z direction, or may calculate the radius of curvature r1 based on a movement distance L1, in the XY direction, from the position of the tool 2 at the start of the canned cycle program lib to the drilling position in the first canned cycle. In the case of the initial-point return mode, the curvature calculating unit 14 may calculate the distance between the initial point and the R point in the Z direction as the radius of curvature r1.

As an alternative to this embodiment in which the control unit 12 moves the tool 2 and the workpiece 4 relative to each other at a rapid traverse rate along the curved paths a and c, the control unit 12 may move the tool 2 and the workpiece 4 relative to each other at a rate lower than the rapid traverse rate. The moving rate of the tool 2 along the curved paths a and c may be changeable between the cutting feed rate and the rapid traverse rate.

For example, as shown in FIG. 6, an argument L that designates a speed ratio between a cutting feed rate $F_C$ and a rapid traverse rate $F_R$ may be added to the canned cycle program 11b. L denotes a value ranging between 0% and 100%. A moving rate F of the tool 2 is defined by the following expression.

$$F=F_C\times(1-(L/100))+F_R\times L/100$$

By setting the value of L, the operator can designate the rate F to any rate between the cutting feed rate and the rapid traverse rate.

As an alternative to this embodiment in which the curved paths a and c are circular-arc shaped and the amount of curvature is the radius of curvature, the curved paths a and c may have a shape other than the circular-arc shape, and the amount of curvature may be a parameter according to the shape of each curved path. For example, each curved path may be a part of an ellipse.

As an alternative to this embodiment in which the curvature calculating unit 14 calculates the radius of curvature rn for a subsequent canned cycle after the start of the fourth operation, the radius of curvature rn may be calculated at another timing so long as the calculation of the radius of curvature rn is completed before the start of the subsequent canned cycle.

As an alternative to this embodiment in which the curvature calculating unit 14 preliminarily reads a positioning command for a subsequent canned cycle during each canned cycle and calculates the radius of curvature for the subsequent canned cycle, the curvature calculating unit 14 may calculate the radius of curvature for each canned cycle by using another method. For example, the curvature calculating unit 14 may read positioning commands for all the canned cycles before the start of the first canned cycle and may calculate movement distances for all the canned cycles. Accordingly, a radius of curvature appropriate for each canned cycle can be calculated.

As an alternative to this embodiment in which the tool 2 is movable in the Z direction and the workpiece 4 is movable in the XY direction, the relative movement between the tool 2 and the workpiece 4 may be achieved in accordance with the movement of either one of or both of the tool 2 and the workpiece 4. For example, the spindle 3 may be movable in the XY direction, and the table 5 may be movable in the Z direction. As another alternative, one of the spindle 3 and the table 5 may be movable in three directions, namely, the X, Y, and Z directions.

Furthermore, as an alternative to this embodiment in which the first direction is the horizontal direction (XY direction) and the second direction is the vertical direction (Z direction), the first direction and the second direction may specifically be changeable, as appropriate, in accordance with the specifications of the machine tool. For example, in a case where the machine tool has the spindle 3 disposed in the horizontal direction, the second direction may be the horizontal direction and the first direction may be any direction intersecting the second direction.

As an alternative to this embodiment in which the tool 2 is movable in the Z direction and the workpiece 4 is movable in the XY direction, if the orientation of the tool 2 is changeable, the tool 2 and the workpiece 4 may be movable diagonally or horizontally. For example, in a case where an angle head to be used has the tool 2 attached in a tilted state to the spindle 3, the workpiece 4 may be machined by tilting the tool 2 in the horizontal direction.

The invention claimed is:

1. A numerical value controller for a machine tool that relatively moves a tool and a workpiece in a first direction and a second direction to drill a hole in the workpiece from a surface of the workpiece by using the tool, the first direction extending along a longitudinal axis of the tool, the second direction intersecting the longitudinal axis of the tool, and the numerical value controller comprises:

a memory that stores a machining program involving executing a plurality of canned cycles, each of the plurality of canned cycles including a first operation, a second operation, a third operation, and a fourth operation, the first operation involving relatively moving the tool and the workpiece in the first direction so as to move the tool to a return point where the tool is retracted from the workpiece in the first direction, the second operation involving relatively moving the tool and the workpiece in the second direction so as to position a drilling position of the workpiece relative to the tool, the third operation involving relatively moving the tool and the workpiece in the first direction so as to move the tool from the return point to a hole bottom point, the fourth operation involving relatively moving the tool and the workpiece in the first direction so as to move the tool from the hole bottom point to a terminal point located toward the hole bottom point relative to the return point; and a processor configured to move the tool between a workpiece height point, which is a position of the surface of the workpiece in the first direction, and the return point along a first curved path by starting the second operation before the first operation ends in one canned cycle of the plurality of canned cycles, and to move the tool between the workpiece height point and the return point along a second curved path by starting the third operation before the second operation ends in the one canned cycle, wherein the processor is configured to:

read a positioning command for the drilling position for a subsequent canned cycle subsequent to the one canned cycle from the machining program stored in the memory before the one canned cycle ends to calculate a movement distance in the second direction from the drilling position in the one canned cycle to the drilling position in the subsequent canned cycle;

set a first value as a radius of curvature of each of the first curved path and the second curved path for the subsequent canned cycle in a case where half of the calculated movement distance is smaller than a retraction distance which is a distance between the workpiece height point and the return point in the first direction, the first value being calculated by multiplying the half of the calculated movement distance by a multiplying factor set in the machining program; and set a second value as the radius of curvature of each of the first curved path and the second curved path for the subsequent canned cycle in a case where the half of the calculated movement distance is greater than or equal to the retraction distance, the second value being calculated by multiplying the retraction distance by the multiplying factor.

2. The numerical value controller according to claim 1, wherein the processor is configured to move the tool along the first curved path and the second curved path at a rapid traverse rate.

3. The numerical value controller according to claim 1, wherein the processor is configured to move the tool along the first curved path and the second curved path at a rate between a rapid traverse rate and a cutting feed rate.

4. The numerical value controller according to claim 1, wherein a moving rate of the tool along the first curved path and the second curved path is changeable to any rate between a rapid traverse rate and a cutting feed rate.

5. The numerical value controller according to claim 1, wherein the terminal point is any one of the workpiece height point, the hole bottom point, and an intermediate position between the workpiece height point and the hole bottom point.

6. The numerical value controller according to claim 1, wherein the processor is configured to calculate the radius of curvature of each of the first curved path and the second curved path for a first canned cycle based on at least one of the retraction distance and a positioning command for the drilling position in the first canned cycle.

7. The numerical value controller according to claim 1, wherein the multiplying factor is configured to be set for each drilling position.

* * * * *